(12) United States Patent
Nishiyama et al.

(10) Patent No.: US 8,157,105 B2
(45) Date of Patent: Apr. 17, 2012

(54) OIL STRAINER FOR AUTOMATIC TRANSMISSION

(75) Inventors: Hiroyuki Nishiyama, Shizuoka (JP); Youji Hiraoka, Kanagawa (JP); Shingo Hirotsu, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 692 days.

(21) Appl. No.: 11/242,893

(22) Filed: Oct. 5, 2005

(65) Prior Publication Data

US 2006/0070943 A1 Apr. 6, 2006

(30) Foreign Application Priority Data

Oct. 6, 2004 (JP) ................................. 2004-293741

(51) Int. Cl.
*B01D 35/28* (2006.01)

(52) U.S. Cl. .................................. 210/435; 123/196 A (58) Field of Classification Search .................. 210/435; 123/196 A
See application file for complete search history.

(56) References Cited

U.S. PATENT DOCUMENTS

| | | | | |
|---|---|---|---|---|
| 3,056,501 | A * | 10/1962 | Thorman et al. | 210/132 |
| 5,971,719 | A | 10/1999 | Takeuchi | |
| D420,682 | S * | 2/2000 | Werner | D15/5 |
| 7,128,218 | B2 * | 10/2006 | Rosendahl et al. | 210/455 |
| 2003/0094405 | A1 * | 5/2003 | Stamey et al. | 210/85 |
| 2004/0007520 | A1 * | 1/2004 | Rosendahl et al. | 210/435 |
| 2005/0098508 | A1 * | 5/2005 | Caldwell | 210/805 |
| 2005/0139541 | A1 * | 6/2005 | Peet et al. | 210/436 |

FOREIGN PATENT DOCUMENTS

| | | |
|---|---|---|
| GB | 2 391 184 A | 2/2004 |
| JP | 10-331961 A | 12/1998 |
| JP | 2000-279719 A | 10/2000 |
| JP | 2004-28145 A | 1/2004 |
| JP | 2004-041964 A | 2/2004 |
| JP | 2004-340327 A | 12/2004 |

* cited by examiner

*Primary Examiner* — Nam Nguyen
*Assistant Examiner* — Denise R Anderson
(74) *Attorney, Agent, or Firm* — Foley & Lardner LLP (57) ABSTRACT

An oil strainer includes a body which has lower and upper walls and an inside space between the lower and upper walls, a filter substantially horizontally disposed within the body so as to divide the inside space into lower and upper space sections, an outlet port provided on the upper wall of the body and communicated with the upper space section, and an inlet port provided on the lower wall of the body and communicated with the lower space section. The lower wall includes a first area in which an inlet port periphery of the inlet port is disposed, and a second area separate from the first area. A vertical distance between the filter and the lower wall in the first area is smaller than a vertical distance between the filter and the lower wall in the second area.

10 Claims, 8 Drawing Sheets

OIL STRAINER FOR AUTOMATIC TRANSMISSION

BACKGROUND OF THE INVENTION

The present invention relates to an oil strainer for an automatic transmission, which is provided in a hydraulic system for supplying a working oil to the automatic transmission in order to remove foreign matters, such as dust contained in the oil.

Japanese Patent Application First Publication No. 2004-28145 describes an oil strainer including a body, a filter disposed at a central portion of the body, an inlet port formed at a lower wall of the body, and an outlet port formed at an upper wall of the body. The outlet port is communicated with an oil pump. The oil pump is driven to suck an oil stored within an oil pan into the oil strainer through the inlet port. The oil sucked is filtered through the filter and then discharged from the outlet port and fed to parts of an automatic transmission via hydraulic passages.

Figure 3:
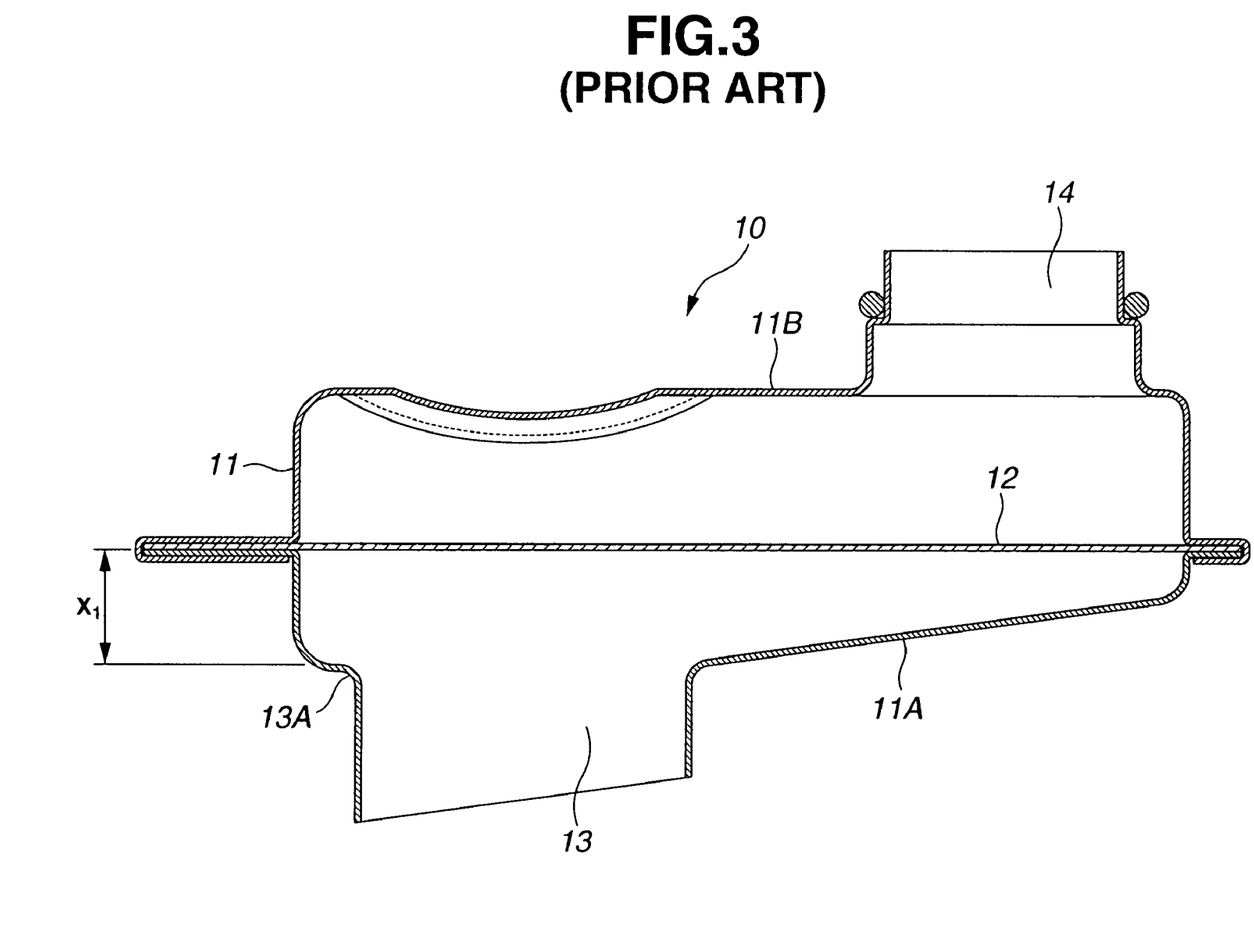
FIG. 3 is a view similar to FIG. 1, but shows a conventional oil strainer.

FIG. 3 illustrates a conventional oil strainer in vertical cross-section. As shown in FIG. 3, conventional oil strainer 10 includes body 11 and filter 12 that is arranged within body 11. Inlet port 13 is provided on lower wall 11A of body 11. Outlet port 14 is provided on upper wall 11B of body 11. Outlet port 14 is connected to an oil pump, not shown, and a hydraulic passage, not shown, connected with the oil pump. An oil within an oil pan, not shown, is sucked into body 11 from inlet port 13 and filtered through filter 12 and then discharged from outlet port 14 to the oil pump.

SUMMARY OF THE INVENTION

During operation of an automatic transmission, air is entrained in a working oil together with foreign matters such as dust, dirt and the like. After the engine is stopped, the air entrained in the working oil comes out to be accumulated in an inside space below a filter within an oil strainer. When the engine is started again to drive an oil pump and supply the working oil, the air accumulated enters into the oil pump to interfere with the proper supply of the working oil by the oil pump. This will cause such a problem that it takes a relatively long time to produce a desired pressure of the working oil. This tendency becomes more remarkable under engine low temperature condition, for example, −20° C. or less, in which viscosity of the working oil is relatively high.

The inventors of the present invention have found that there is a relationship between a volume of the air accumulated in a space below a filter within an oil strainer and a hydraulic pressure rise time during which a hydraulic pressure is varied from a minimum value, for instance, 0, at which an operation of the oil pump starts with engine startup, to a desired value. On the basis of this finding, the present invention has been made. That is, it has been found that the above-described problem of the conventional art can be solved by reducing a volume of the space below the filter within the oil strainer with maintaining a performance of the oil strainer. An object of the present invention is to provide an oil strainer capable of effectively suppressing entrainment of air into a working oil in an automatic transmission while maintaining a performance of the oil strainer.

In one aspect of the present invention, there is provided an oil strainer for an automatic transmission, comprising:
a body including a lower wall, an upper wall and an inside space defined between the lower and upper walls;
a filter substantially horizontally disposed within the body so as to divide the inside space of the body into a lower space section and an upper space section;
an outlet port provided on the upper wall of the body and communicated with the upper space section; and
an inlet port provided on the lower wall of the body and communicated with the lower space section,
wherein the lower wall includes a first area in which an inlet port periphery of the inlet port is disposed, and a second area separate from the first area, and
wherein a vertical distance between the filter and the lower wall in the first area is smaller than a vertical distance between the filter and the lower wall in the second area.

DETAILED DESCRIPTION OF THE INVENTION

Figure 1:
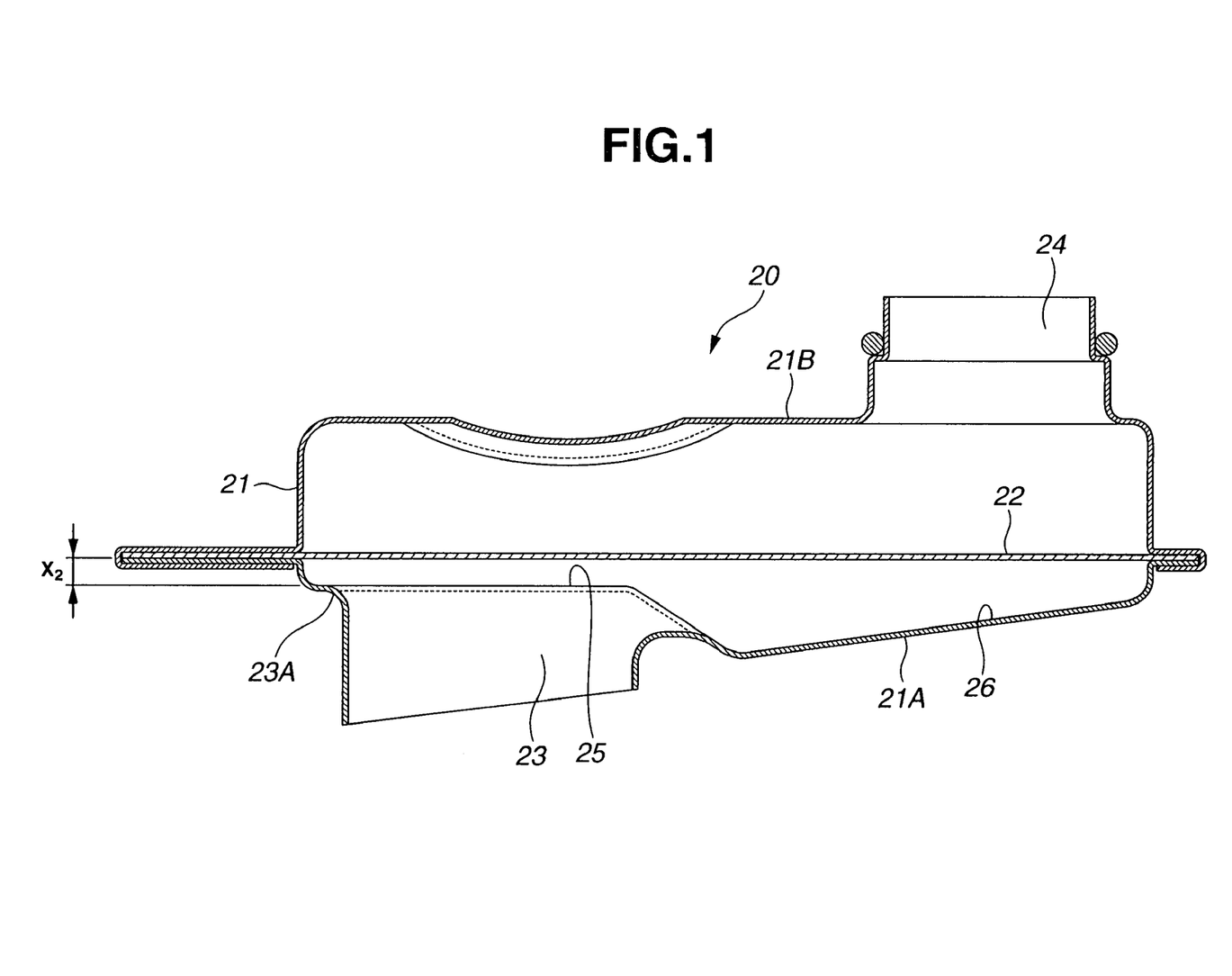
FIG. 1 is a vertical cross-sectional view of an oil strainer of a first embodiment according to the present invention.

In the following, embodiments of the present invention will be described with reference to the accompanying drawings. FIG. 1 is a vertical cross-section of an oil strainer according to a first embodiment of the present invention. As illustrated in FIG. 1, oil strainer 20 includes body 21 and filter 22 substantially horizontally disposed within body 21. Body 21 includes lower wall 21A and upper wall 21B which are disposed on lower and upper sides of oil strainer 20 in a vertical direction, i.e., an up-and-down direction of oil strainer 20, respectively. Filter 22 is in the form of a mesh and arranged to divide an inside space of body 21 into a lower space section and an upper space section. Filter 22 may be placed in a substantially central position within body 21 in the vertical direction of oil strainer 20. Thus, the lower space section is defined between filter 22 and lower wall 21A, and the upper space section is defined between filter 22 and upper wall 21B. Oil strainer 20 further includes inlet port 23 provided on lower wall 21A and outlet port 24 provided on upper wall 21B. Inlet port 23 is provided in area 25 of lower wall 21A and communicated with the lower space section. Specifically, inlet port 23 is defined by a tubular wall portion which is integrally formed with lower wall 21A and downwardly extends from inlet port periphery 23A toward an oil pan, not shown. Outlet port 24 is provided on upper wall 21B and communicated with the upper space section. Outlet port 24 is arranged in non-alignment with inlet port 23 in the vertical direction of oil strainer 20. Outlet port 24 is defined by a cylindrical wall portion that is integrally formed with upper wall 21B and upwardly extends. Outlet port 24 is connected to an oil pump, not shown. When an operation of the oil pump starts with engine startup, a working oil stored within the oil pan is sucked and introduced into inlet port 23 and flows in the lower space section below filter 22. The working oil is filtered through filter 22 and discharged from outlet port 24, and then fed to the oil pump and supplied to parts of an automatic transmission via a hydraulic passage that is connected with the oil pump.

Figure 2:
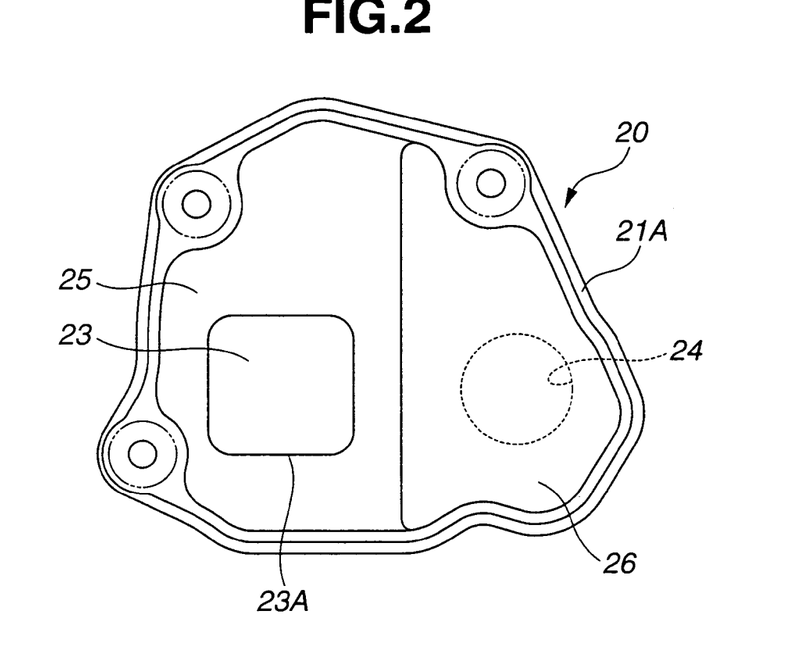
FIG. 2 is a plan view of an inside bottom of a lower wall of the oil strainer shown in FIG. 1.

FIG. 2 is a plan view of an inside bottom of lower wall 21A of oil strainer 20 without filter 22. As illustrated in FIGS. 1 and 2, lower wall 21A includes two areas 25 and 26, namely, area 25 in which inlet port periphery 23A is disposed, and area 26 separate from area 25. Area 25 substantially horizontally extends along inlet port periphery 23A defining an upper opening of inlet port 23 which is exposed to the lower space section. Area 26 includes an inner region substantially vertically aligned with a lower opening of outlet port 24 which is exposed to the upper space section, and an outer region that surrounds the inner region and extends outside the inner region. A boundary between area 25 and area 26 extends substantially perpendicular to a direction of streamline of the oil which flows in the lower space section from inlet port 23 toward area 26. Lower wall 21A is configured such that vertical distance $X_2$ between filter 22 and lower wall 21A in area 25 is smaller than a vertical distance between filter 22 and lower wall 21A in area 26 as shown in FIG. 1. Specifically, the vertical distances between filter 22 and lower wall 21A in respective areas 25 and 26 extend between a lower surface of filter 22 and an upper surface of lower wall 21A in respective areas 25 and 26 in the vertical direction of oil strainer 20. In other words, a depth from filter 22 to lower wall 21A in area 25 is smaller than a depth from filter 22 to lower wall 21A in area 26. Thus, area 25 acts as a small depth area of lower wall 21A, and area 26 acts as a large depth area of lower wall 21A.

Figure 4:
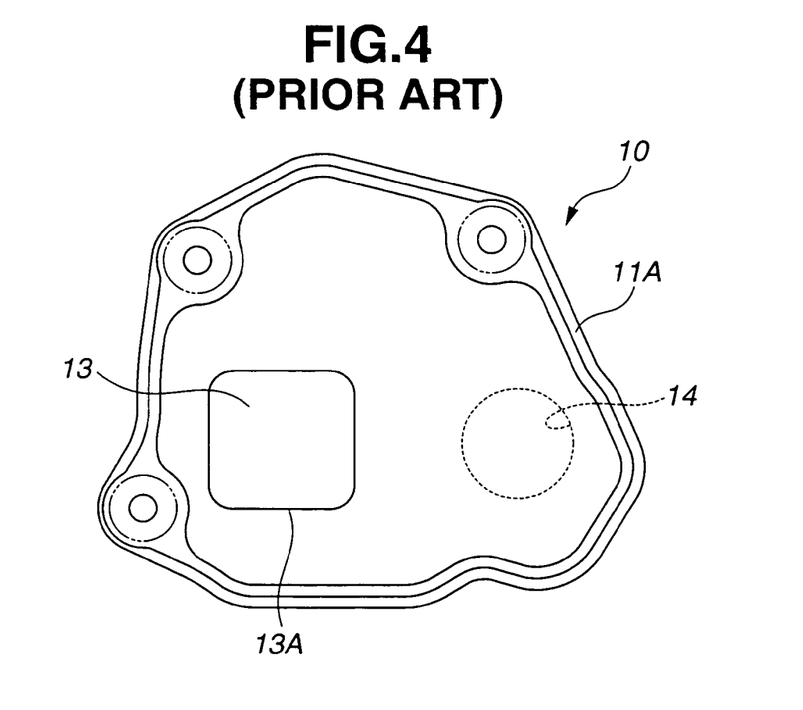
FIG. 4 is a plan view of an inside bottom of a lower wall of the oil strainer shown in FIG. 3.

In comparison to the conventional oil strainer as shown in FIGS. 3 and 4, the features of oil strainer 20 of the first embodiment of the present invention are explained. FIGS. 3 and 4 are a vertical cross-section of a conventional oil strainer and a plan view of an inside bottom of lower wall 11A of conventional oil strainer 10, respectively. As illustrated in FIG. 3, conventional oil strainer 10 includes body 11 and filter 12 disposed within body 11. Body 11 includes lower wall 11A and upper wall 11B which are disposed on lower and upper sides of conventional oil strainer 10 in a vertical direction, i.e., an up-and-down direction of conventional oil strainer 10. Filter 12 is in the form of a mesh and substantially horizontally arranged in a substantially central position within body 11 so as to divide an inside space of body 11 into a lower space section and an upper space section. Conventional oil strainer 10 further includes inlet port 13 provided on lower wall 11A and outlet port 14 provided on upper wall 11B. Inlet port 13 is communicated with the lower space section. Inlet port 13 is defined by a tubular wall portion which is integrally formed with lower wall 11A and downwardly extends from inlet port periphery 13A toward an oil pan, not shown. There is vertical distance $X_1$ between a lower surface of filter 12 and an upper surface of inlet port periphery 13A of lower wall 11A. Outlet port 14 is provided on upper wall 11B and communicated with the upper space section. Outlet port 14 is arranged in non-alignment with inlet port 13 in the vertical direction of conventional oil strainer 10. Outlet port 14 is defined by a cylindrical wall portion that is integrally formed with upper wall 21 B and upwardly extends. Outlet port 14 is connected to an oil pump, not shown. In conventional oil strainer 10, when an operation of the oil pump starts, a working oil stored within the oil pan is sucked from inlet port 13, filtered through filter 12 and discharged from outlet port 14. The working oil discharged is fed to the oil pump and then supplied to parts of an automatic transmission via a hydraulic passage connected with the oil pump.

In comparison between oil strainer 20 of the first embodiment and conventional oil strainer 10, vertical distance $X_2$ between filter 22 and lower wall 21A in first area 25 of oil strainer 20 as shown in FIG. 1 is smaller than vertical distance $X_1$ between filter 12 and inlet port periphery 13A of conventional oil strainer 10 as shown in FIG. 3. Therefore, the volume of the lower space section of oil strainer 20 becomes decreased as compared to the volume of the lower space section of conventional oil strainer 10. This results in reduction in amount of the air that is accumulated in the lower space section below filter 22 of oil strainer 20, as compared to an amount of the air that is accumulated in the lower space section below filter 12 of conventional oil strainer 10.

Figure 5:
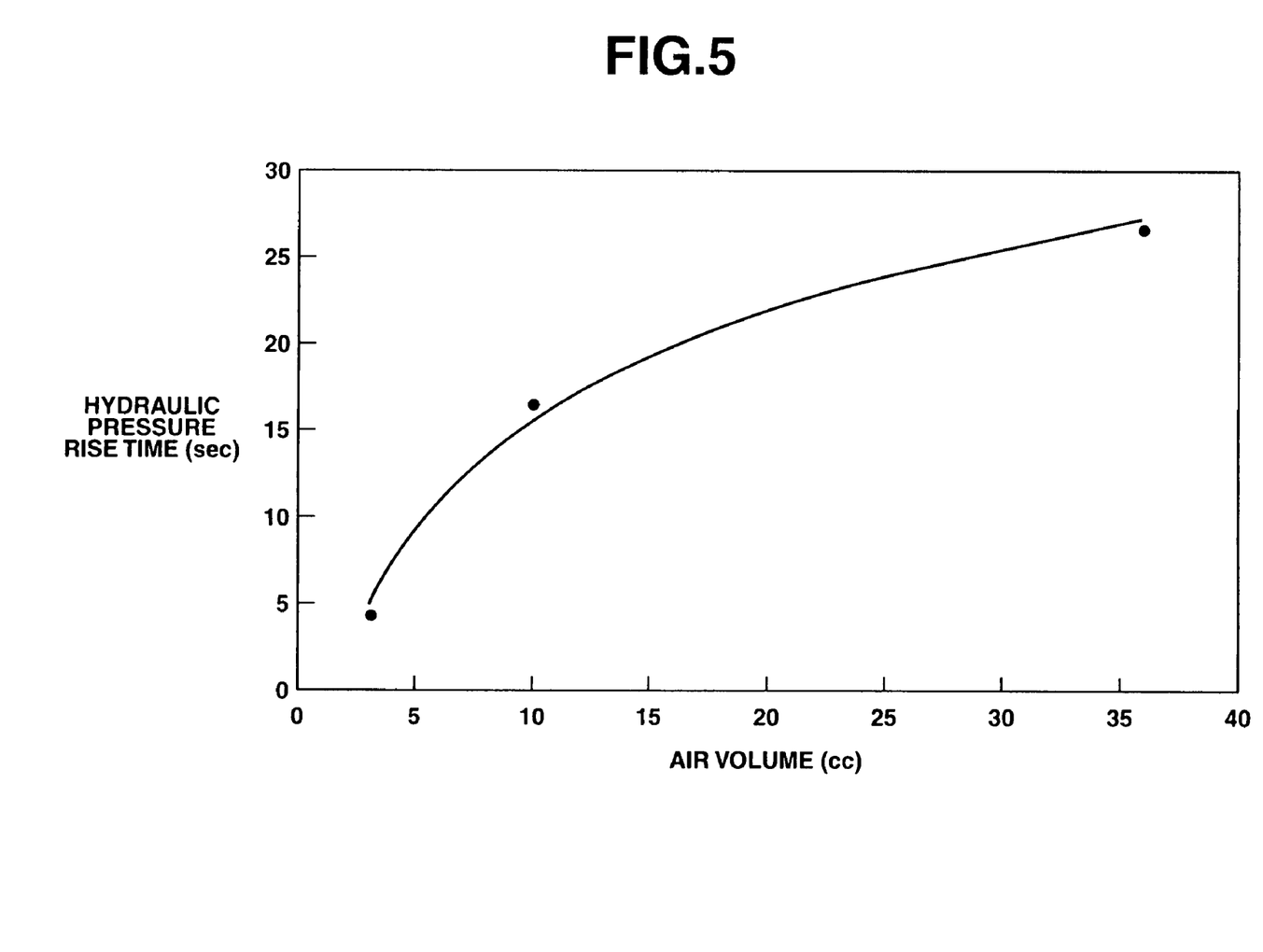
FIG. 5 is a diagram illustrating a relationship between a volume of air accumulated in an oil strainer and a hydraulic pressure rise time.

FIG. 5 illustrates a relationship between a volume of the air accumulated in the lower space section below the filter in the conventional oil strainer and a hydraulic pressure rise time during which a hydraulic pressure is varied from a minimum value when an operation of the oil pump starts with engine startup, to a desired value. As seen from FIG. 5, as the volume of the air accumulated, namely, the amount of the air accumulated becomes larger, the hydraulic pressure rise time is increased.

Figure 6:
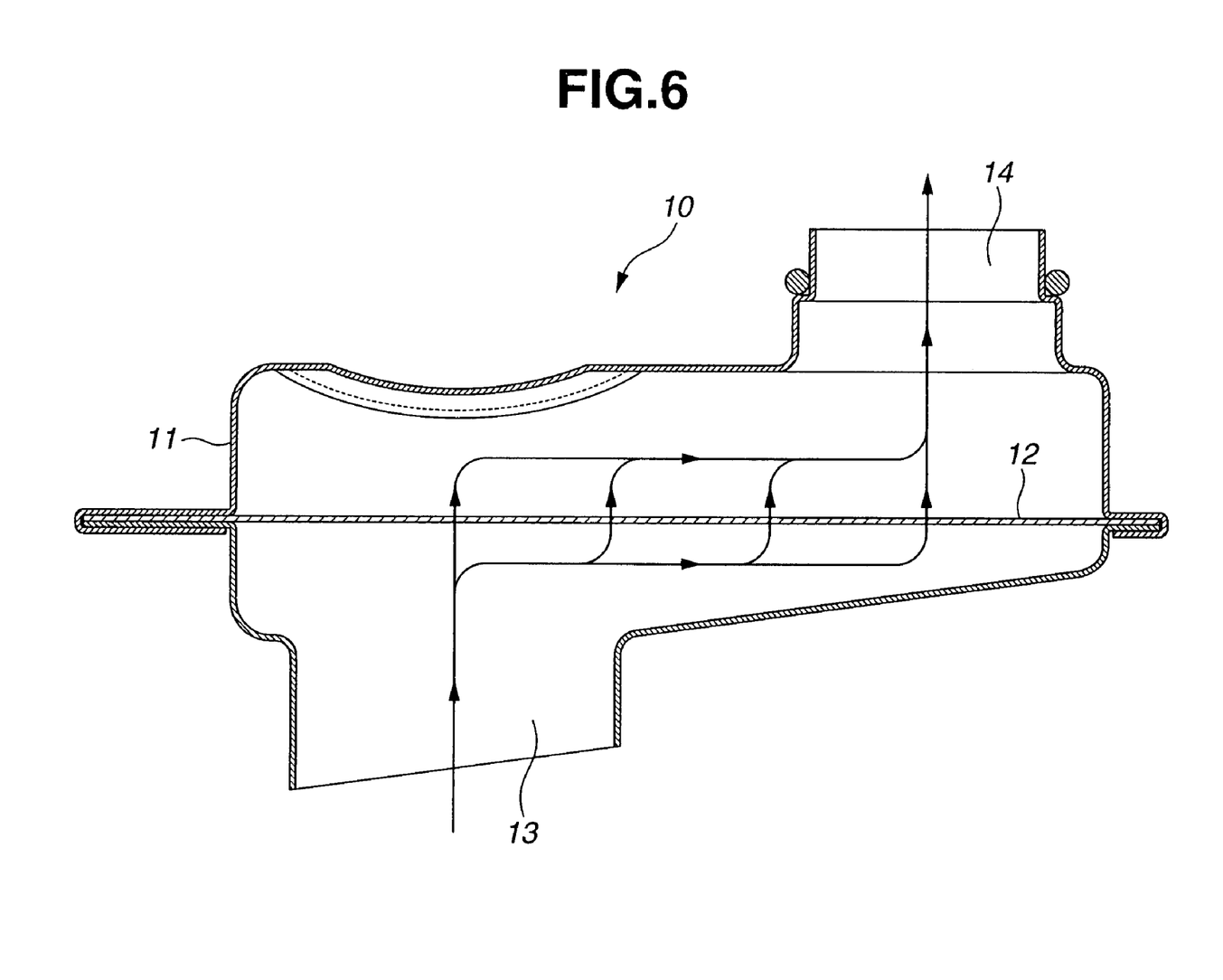
FIG. 6 is a schematic diagram illustrating a predictive pattern of an oil flow in an oil strainer.
Figure 7:
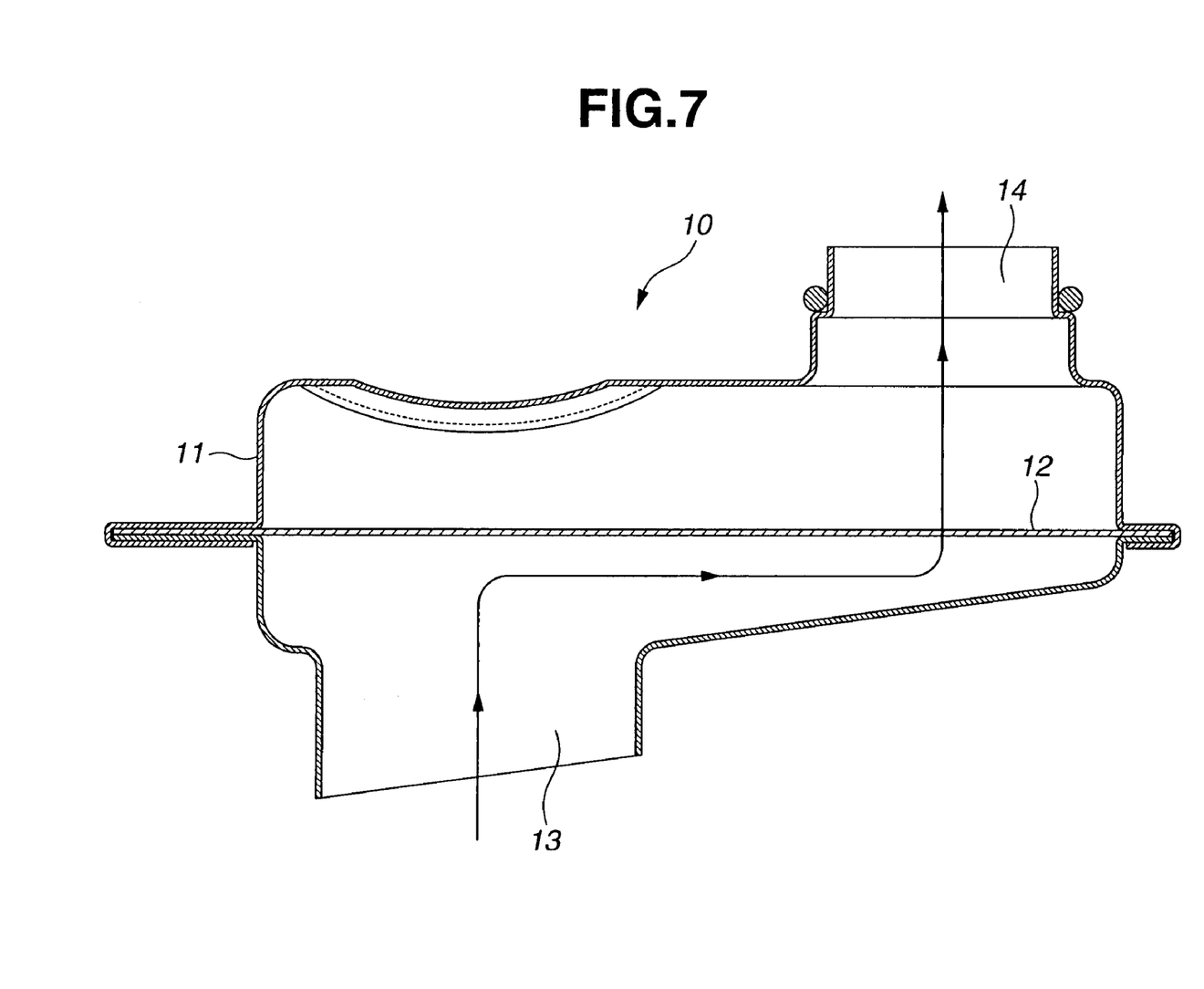
FIG. 7 is a schematic diagram illustrating an actual pattern of an oil flow in an oil strainer.

FIG. 6 illustrates a predictive pattern of a flow of an oil flowing in conventional oil strainer 10 as shown in FIG. 3 when starting an operation of the oil pump under a relatively low oil temperature condition. FIG. 7 illustrates an actual pattern of the oil flow flowing in conventional oil strainer 10 when starting an operation of the oil pump under the same oil temperature condition. As shown in FIG. 6, the oil flow is predicted such that the oil flowing from inlet port 13 into the lower space section passes and penetrates through a substantially entire area of the respective lower and upper surfaces of filter 12 and then flows out from outlet port 14 as indicated by arrows.

In contrast, as shown in FIG. 7, the actual oil flow in conventional oil strainer 10 is observed as indicated by arrows. The oil flowing from inlet port 13 into the lower space section flows beneath filter 12 therealong toward a part of the lower space section which is positioned below outlet port 14. When the oil reaches the part of the lower space section, the oil passes and penetrates through a local area of the respective lower and upper surfaces of filter 12 which is in alignment with an opening of outlet port 14 in the vertical direction of oil strainer 10. The reason for the actual oil flow is considered as follows. Under the relatively low oil temperature condition, the oil has an increased viscosity to thereby cause an increased flow resistance occurring when the oil passes through filter 12. Due to the increased flow resistance, the oil flowing from inlet port 13 is prevented from readily passing and penetrating through filter 12, and allowed to flow beneath along the lower surface of filter 12. The oil is then allowed to pass and penetrate through the local area of the respective lower and upper surfaces of filter 12 by a suction force, i.e., by a negative pressure caused by operation of the oil pump.

As is understood from the above observation results, even when the vertical distance between the filter and the inlet port periphery of the lower wall of the oil strainer is reduced to thereby reduce the volume of the part of the lower space section between the filter and the inlet port periphery, the oil flow in the oil strainer will not be adversely affected by the reduction in the volume and will be free from increase in flow resistance of the oil passing through the filter under the relatively low oil temperature condition. Further, if the vertical distance between the filter and the inlet port periphery of the lower wall of the oil strainer is reduced, and therefore, the volume of the part of the lower space section is reduced, an amount of the air accumulated in the lower space section of the oil strainer can be reduced. As a result, when an operation of the oil pump starts, the accumulated air passing through the filter and flowing from the outlet port into the oil pump and the hydraulic passage together with the oil can be reduced in amount.

As explained above, with the provision of small depth area 25 in lower wall 21A, oil strainer 20 of the first embodiment can reduce an amount of the air accumulated in the lower space section below filter 22 during a period in which an operation of the oil pump is stopped. This results in effectively preventing the accumulated air from being fed to the oil pump when starting the operation of the oil pump. Therefore, oil strainer 20 of the first embodiment serves for suppressing the increase in hydraulic pressure rise time which will occur in the conventional oil strainer when starting the operation of the oil pump, particularly, under the relatively low oil temperature condition. Further, oil strainer 20 can maintain a good performance without adversely affecting flow resistance of the oil flowing in the lower space section of oil strainer 20.

Figure 8:
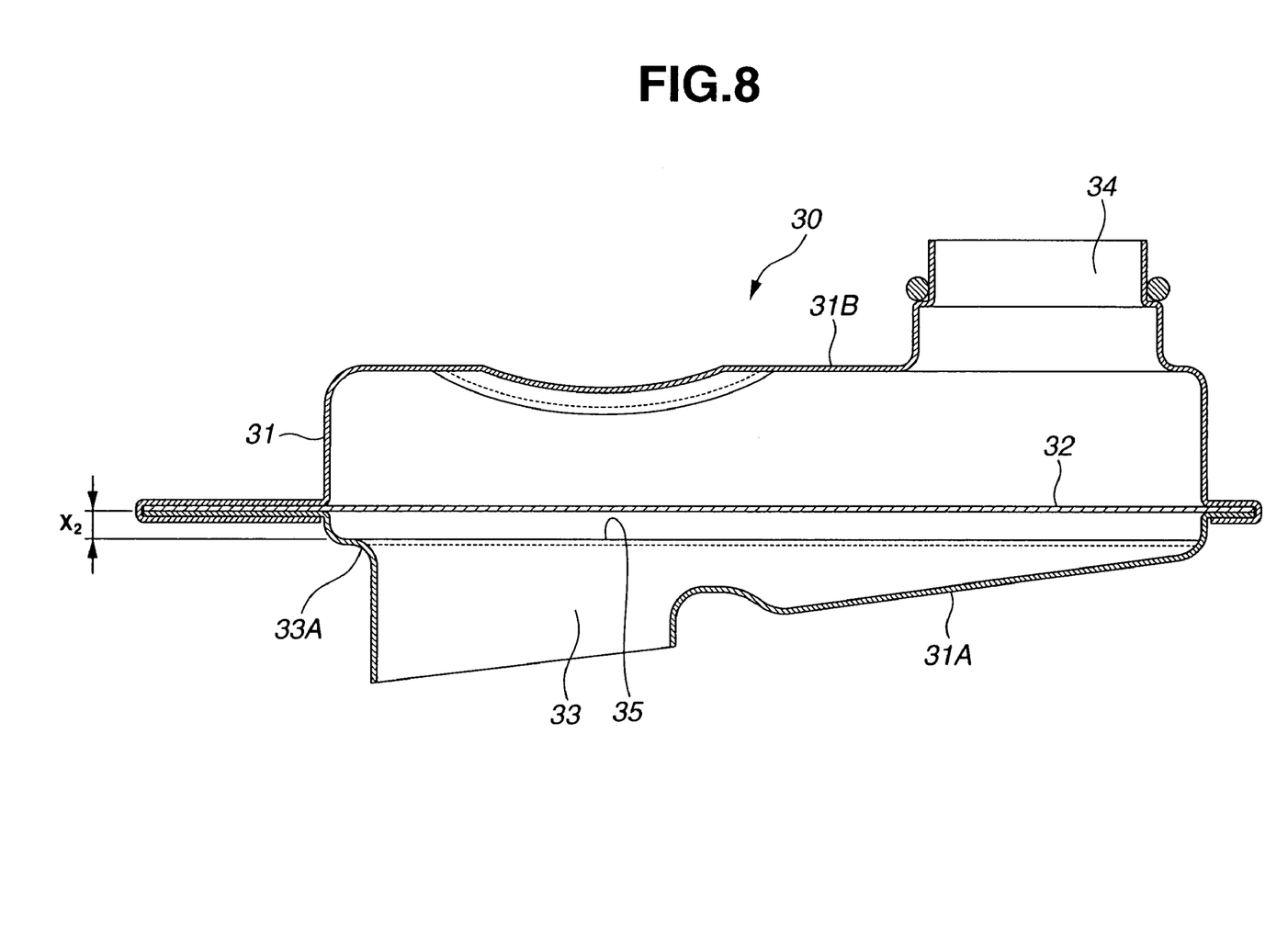
FIG. 8 is a view similar to FIG. 1, but shows a second embodiment of the oil strainer of the present invention.
Figure 9:
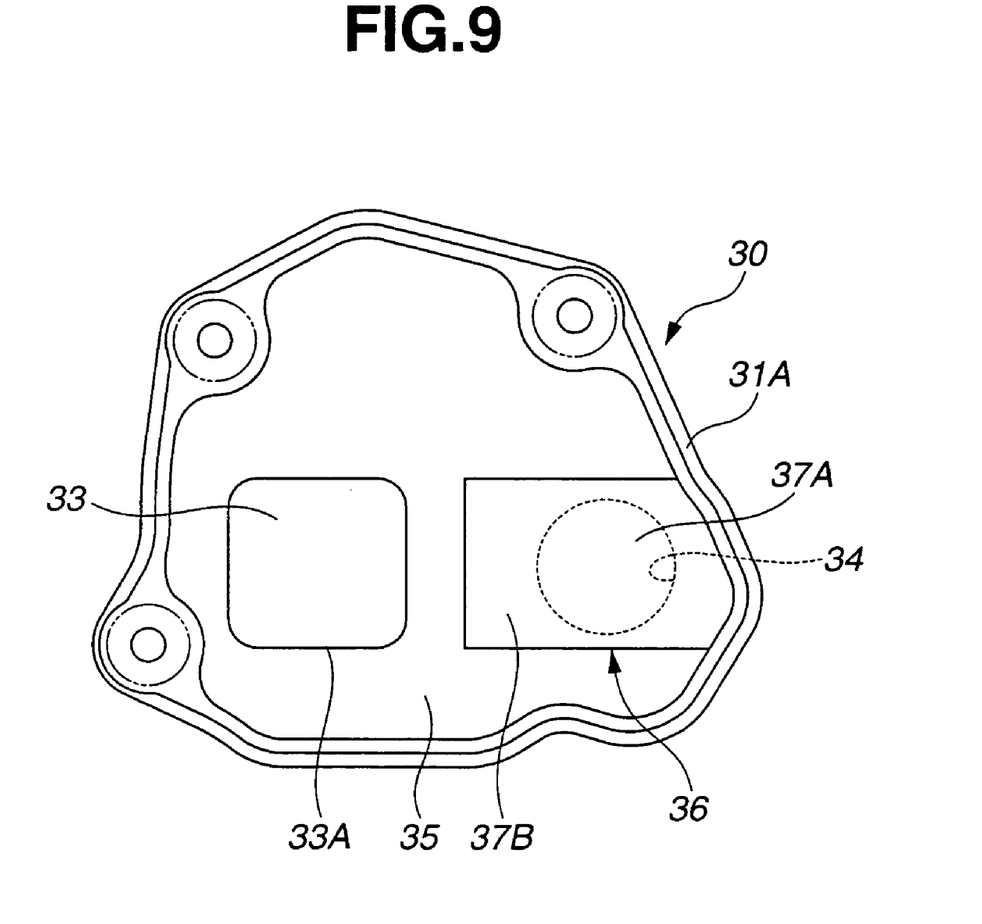
FIG. 9 is a plan view of an inside bottom of a lower wall of the oil strainer shown in FIG. 8.

Referring to FIGS. 8 and 9, a second embodiment of the oil strainer of the present invention will be explained hereinafter. FIGS. 8 and 9 are a vertical cross-section of an oil strainer and a plan view of an inside bottom of lower wall 13A of oil strainer 30, respectively. As illustrated in FIG. 8, oil strainer 30 includes body 31 and filter 32 disposed within body 31. Body 31 includes lower wall 31A and upper wall 31B which are disposed on lower and upper sides of oil strainer 30 in a vertical direction, i.e., an up-and-down direction of oil strainer 30. Filter 32 is in the form of a mesh and substantially horizontally arranged within body 31 such that an inside space of body 31 is divided into a lower space section defined between filter 32 and lower wall 31A and an upper space section defined between filter 32 and upper wall 31B. Oil strainer 30 further includes inlet port 33 provided on lower wall 31A and outlet port 34 provided on upper wall 31B. Inlet port 33 is provided in area 35 of lower wall 31A and communicated with the lower space section. Specifically, inlet port 33 is defined by a tubular wall portion which is integrally formed with lower wall 31A and downwardly extends from inlet port periphery 33A toward an oil pan, not shown. Outlet port 34 is provided on upper wall 31 B and communicated with the upper space section. Outlet port 34 is arranged in non-alignment with inlet port 33 in the vertical direction of oil strainer 30. Outlet port 34 is defined by a cylindrical wall portion that is integrally formed with upper wall 31B and upwardly extends. Outlet port 34 is connected to an oil pump, not shown. Similar to the first embodiment, when an operation of the oil pump starts with engine startup, a working oil stored within the oil pan is sucked and introduced into inlet port 33 and flows in the lower space section below filter 32. The working oil is filtered through filter 32 and discharged from outlet port 34, and then fed to the oil pump and supplied to parts of an automatic transmission via a hydraulic passage that is connected with the oil pump.

As illustrated in FIG. 9, lower wall 31A includes area 35 in which inlet port periphery 33A is disposed, and area 36 separate from area 35. Area 35 substantially horizontally extends along inlet port periphery 33A defining an upper opening of inlet port 33 which is exposed to the lower space section. In this embodiment, area 36 has an elongated rectangular shape in plan view as shown in FIG. 9. Area 36 includes inner region 37A substantially vertically aligned with a lower opening of outlet port 34 which is exposed to the upper space section, and outer region 37B that surrounds inner region 37A and extends outside inner region 37A to a side periphery of lower wall 31A. Outer region 37B extends along a direction of streamline of the oil that flows in the lower space section from inlet port 33 toward inner region 37A of area 36. Outer region 37B includes a portion that extends between inlet port periphery 33A and inner region 37A along the direction of streamline of the oil that flows in the lower space section from inlet port 33 toward inner region 37A. That is, outer region 37B is located on a shortest route of streamline of the oil flowing in the lower space section from inlet port 33 toward inner region 37A. Area 35 includes a portion that extends along and adjacent to area 36 in parallel to the direction of streamline of the oil that flows in the lower space section from inlet port 33 toward inner region 37A of area 36. With the provision of the portion of area 35, area 35 is increased in comparison to area 25 of lower wall 21A of oil strainer 20 of the first embodiment. Vertical distance $X_2$ between filter 32 and lower wall 31A in area 35 is smaller than a vertical distance between filter 32 and lower wall 31A in area 36. In other words, a vertical distance between filter 32 and lower wall 31A in area 36 is larger than vertical distance $X_2$ between filter 32 and lower wall 31A in area 35. Specifically, the vertical distances between filter 32 and lower wall 31A in respective areas 35 and 36 extend between a lower surface of filter 32 and an upper surface of lower wall 31A in respective areas 35 and 36.

As explained above, in the second embodiment, area 35 of lower wall 31A of oil strainer 30 is increased as compared to area 25 of lower wall 21A of oil strainer 20 of the first embodiment. Therefore, the lower space section of oil strainer 30 has a volume less than a volume of the lower space section of oil strainer 20 of the first embodiment. Accordingly, oil strainer 30 of the second embodiment can further reduce an amount of the air accumulated in the lower space section below filter 32 in comparison to oil strainer 20 of the first embodiment. As a result, oil strainer 30 of the second embodiment can serve for more effectively preventing the accumulated air from being fed to an oil pump when the operation of the oil pump starts. Accordingly, oil strainer 30 of the second embodiment serves for further suppressing the increase in hydraulic pressure rise time which will occur in the conventional oil strainer when starting an oil pump. Further, oil strainer 30 of the second embodiment can maintain a smooth flow of the oil flowing in the lower space section.

This application is based on prior Japanese Patent Application No. 2004-293741 filed on Oct. 6, 2004. The entire contents of the Japanese Patent Application No. 2004-293741 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil strainer for an automatic transmission, comprising:
 a body including a lower wall, an upper wall and an inside space defined between the lower and upper walls;
 a filter substantially horizontally disposed within the body so as to divide the inside space of the body into a lower space section defined between the lower wall and the filter and an upper space section defined between the upper wall and the filter;
 an outlet port provided on the upper wall of the body and communicated with the upper space section; and an inlet port provided on the lower wall of the body and communicated with the lower space section, the inlet port having an upper opening that is exposed to the lower space section, wherein the lower wall includes a first area in which an inlet port periphery defining the upper opening of the inlet port is disposed, and a second area separate from the first area in which the second area is disposed below the outlet port in a vertical direction of the oil strainer, wherein the first area containing the inlet port periphery is disposed to be opposed to the filter in a vertical direction of the oil strainer, and wherein a first spaced vertical distance extends between the filter and the first area of the lower wall, a second spaced vertical distance extends between the filter and the second area of the lower wall, and the first vertical distance is smaller than the second vertical distance, and wherein an entire portion of the second area disposed directly below the outlet port in the vertical direction of the oil strainer is spaced from the filter at least by the second vertical distance.

2. The oil strainer as claimed in claim 1, wherein the first area substantially horizontally extends along the inlet port periphery of the inlet port.

3. The oil strainer as claimed in claim 1, wherein the second area comprises an inner region substantially vertically aligned with an opening of the outlet port and an outer region that surrounds the inner region.

4. The oil strainer as claimed in claim 1, wherein the outlet port is arranged in non-alignment with the inlet port in the vertical direction of the oil strainer.

5. The oil strainer as claimed in claim 1, wherein the inlet port allows oil to be introduced into the lower space section, the filter allows the oil introduced into the lower space section to be filtered, the outlet port allows the oil filtered by the filter to flow out therefrom, and a boundary exists between the first area and the second area which extends substantially perpendicular to a direction of streamlines of oil that flow in the lower space section from the inlet port toward the second area.

6. The oil strainer as claimed in claim 3, wherein the inlet port allows oil to be introduced into the lower space section, the filter allows the oil introduced into the lower space section to be filtered, the outlet port allows the oil filtered by the filter to flow out therefrom, and the first area includes a portion that extends along and is adjacent to the second area in parallel to a direction of streamlines of oil that flow in the lower space section from the inlet port toward the inner region of the second area.

7. The oil strainer as claimed in claim 6, wherein the outer region of the second area extends along the direction of the streamlines of oil that flow in the lower space section from the inlet port toward the inner region of the second area.

8. The oil strainer as claimed in claim 7, wherein the outer region of the second area includes a portion that extends between the inlet port periphery of the inlet port and the inner region of the second area along the direction of the streamlines of oil that flow in the lower space section from the inlet port toward the inner region of the second area.

9. The oil strainer as claimed in claim 7, wherein the outer region is located on a shortest route of streamline of the oil flowing in the lower space section from the inlet port toward the inner region of the second area.

10. The oil strainer as claimed in claim 1, wherein the outlet port is provided on the upper wall of the body at a vertical distance above the filter such that the outlet port is in direct fluid communication with the upper space section.

* * * * *